(12) United States Patent
Segal et al.

(10) Patent No.: US 12,423,426 B1
(45) Date of Patent: Sep. 23, 2025

(54) SYSTEM AND METHOD FOR TRACING CLOUD COMPUTING ENVIRONMENT DEPLOYMENTS TO CODE OBJECTS UTILIZING UNIQUE FINGERPRINTS

(71) Applicant: Wiz, Inc., New York, NY (US)

(72) Inventors: Assaf Segal, Tel Aviv (IL); Amir Lande Blau, Tel Aviv (IL); Tal Gilady, Tel Aviv (IL); Ami Luttwak, Binyamina (IL); Arnon Trabelsi, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/954,023

(22) Filed: Nov. 20, 2024

(51) Int. Cl.
*G06F 21/56* (2013.01)

(52) U.S. Cl.
CPC ...... *G06F 21/565* (2013.01); *G06F 2221/033* (2013.01)

(58) Field of Classification Search
USPC .......................................................... 726/23
See application file for complete search history.

(56) References Cited

U.S. PATENT DOCUMENTS

| | | | |
|---|---|---|---|
| 9,009,821 B2 * | 4/2015 | Podjarny | G06F 21/563 726/22 |
| 9,846,776 B1 | 12/2017 | Paithane et al. | |
| 10,423,787 B2 | 9/2019 | Wachdorf et al. | |
| 11,625,489 B2 * | 4/2023 | Morello | G06F 9/44505 726/23 |
| 2014/0007229 A1 * | 1/2014 | Smith | G06F 21/57 726/22 |
| 2017/0329968 A1 * | 11/2017 | Wachdorf | G06F 21/566 |
| 2019/0213319 A1 * | 7/2019 | Gerebe | H04L 63/12 |
| 2021/0042411 A1 * | 2/2021 | Annen | G06N 3/08 |
| 2021/0406372 A1 * | 12/2021 | Albero | G06F 21/564 |
| 2023/0012869 A1 * | 1/2023 | Suarez | G06F 8/71 |
| 2023/0315843 A1 * | 10/2023 | Yona | G06F 21/54 726/22 |
| 2024/0146745 A1 * | 5/2024 | Lidgi | H04L 63/1416 |

* cited by examiner

*Primary Examiner* — Sakinah White Taylor
(74) *Attorney, Agent, or Firm* — M&B IP Analysts, LLC

(57) ABSTRACT

A system and method for improving inspection of software containers is presented. The method includes detecting a plurality of configuration files, each corresponding to a software container image corresponding to a software container deployed in the cloud computing environment; parsing a first configuration file to detect a first plurality of commands; generating a first fingerprint based on the detected first plurality of commands; parsing a second configuration file to detect a second plurality of commands; generating a second fingerprint based on the detected second plurality of commands; determining that the first configuration file matches the second configuration file in response to detecting a match based on the fingerprints; determining that the first configuration file mismatches the second configuration file in response to detecting a mismatch; and inspecting the first configuration file for a cybersecurity object in response to determining that the first configuration file matches the second configuration file.

19 Claims, 9 Drawing Sheets

SYSTEM AND METHOD FOR TRACING CLOUD COMPUTING ENVIRONMENT DEPLOYMENTS TO CODE OBJECTS UTILIZING UNIQUE FINGERPRINTS

TECHNICAL FIELD

The present disclosure relates generally to the field of detecting cybersecurity threats, and specifically detecting cybersecurity threats utilizing fingerprints of configuration files of a software container.

BACKGROUND

An operating system-level virtualization describes various endeavors which attempt to efficiently provision hardware resources (virtualization), while keeping such provisions contained within themselves, so that other tenants on the same system are not able to access each other's systems, files, etc., unless such access is specifically granted.

A container is deployed in a cloud computing environment, such as a virtual private cloud (VPC) of a cloud computing infrastructure, such as Amazon® Web Services (AWS), Google® Cloud Platform (GCP), Microsoft® Azure, and the like. A container is deployed by a container engine, such as RKT, Docker®, and the like, from a mount point of a container image. A container (e.g. Docker® Container) may be generated based on multiple container images, also known as layers. A layer is generated whenever a change is made to the container image, such as installing an application, adding a file, removing a file, updating a registry value, and the like operations.

Container files (e.g. Dockerfiles®) are used to generate containers which may be exposed to cybersecurity threats, secrets, vulnerabilities, and exposures. Thus, it is important to inspect container files to detect such cybersecurity threats and vulnerabilities. However, it takes a significant amount of resource usage, processing memory, storage, etc., to inspect a container and its container files for cybersecurity threats and vulnerabilities.

Thus, it would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include detecting a plurality of configuration files, each configuration file corresponding at least to a software container image, the software container image corresponding to a software container deployed in the cloud computing environment. The method may also include parsing a first configuration file of the plurality of configuration files to detect a first plurality of commands. The method may furthermore include generating a first fingerprint based at least on the detected first plurality of commands. The method may in addition include parsing a second configuration file of the plurality of configuration files to detect a second plurality of commands. The method may moreover include generating a second fingerprint based at least on the detected second plurality of commands. The method may also include determining that the first configuration file matches the second configuration file in response to detecting a match based on the first fingerprint and the second fingerprint. The method may furthermore include determining that the first configuration file mismatches the second configuration file in response to detecting a mismatch based on the first fingerprint and the second fingerprint. The method may in addition include inspecting the first configuration file for a cybersecurity object in response to determining that the first configuration file matches the second configuration file. Other embodiments of this aspect include corresponding computer systems, apparatus, and computer programs recorded on one or more computer storage devices, each configured to perform the actions of the methods.

Implementations may include one or more of the following features. The method may include: generating another second fingerprint if it is determined that the first configuration file mismatches the second configuration file. The method may include: generating another second fingerprint based on an another configuration file, which is not the second configuration file. The method may include: generating a first fingerprint based on: a command, a number of commands, a sequence of commands, a configuration of a command, an argument of a command, a parameter of a command, and any combination thereof. The method may include: generating a second fingerprint based on: commands, number of commands, sequence of commands, a configuration of commands, and any combination thereof. The method may include: parsing the first configuration file to detect code objects, code, commands, and any combination thereof. The method may include: parsing the second configuration file to detect code objects, code, commands, and any combination thereof. The method may include: detecting a cybersecurity object, where the cybersecurity object is associated with a cybersecurity threat. The method where the cybersecurity threat includes any one of: an exposure, a vulnerability, malware, ransomware, spyware, a misconfiguration, and any combination thereof. Implementations of the described techniques may include hardware, a method or process, or a computer tangible medium.

In one general aspect, a non-transitory computer-readable medium may include one or more instructions that, when executed by one or more processors of a device, cause the device to: detect a plurality of configuration files, each configuration file corresponding at least to a software container image, the software container image corresponding to a software container deployed in the cloud computing environment; parse a first configuration file of the plurality of configuration files to detect a first plurality of commands;

generate a first fingerprint based at least on the detected first plurality of commands; parse a second configuration file of the plurality of configuration files to detect a second plurality of commands; generate a second fingerprint based at least on the detected second plurality of commands; determine that the first configuration file matches the second configuration file in response to detecting a match based on the first fingerprint and the second fingerprint; determine that the first configuration file mismatches the second configuration file in response to detecting a mismatch based on the first fingerprint and the second fingerprint; and inspect the first configuration file for a cybersecurity object in response to determining that the first configuration file matches the second configuration file. Other embodiments of this aspect include corresponding computer systems, apparatus, and computer programs recorded on one or more computer storage devices, each configured to perform the actions of the methods.

In one general aspect, a system may include one or more processors configured to: detect a plurality of configuration files, each configuration file corresponding at least to a software container image, the software container image corresponding to a software container deployed in the cloud computing environment. The system may furthermore parse a first configuration file of the plurality of configuration files to detect a first plurality of commands. The system may in addition generate a first fingerprint based at least on the detected first plurality of commands. The system may moreover parse a second configuration file of the plurality of configuration files to detect a second plurality of commands. The system may also generate a second fingerprint based at least on the detected second plurality of commands. The system may furthermore determine that the first configuration file matches the second configuration file in response to detecting a match based on the first fingerprint and the second fingerprint. The system may in addition determine that the first configuration file mismatches the second configuration file in response to detecting a mismatch based on the first fingerprint and the second fingerprint. The system may moreover inspect the first configuration file for a cybersecurity object in response to determining that the first configuration file matches the second configuration file. Other embodiments of this aspect include corresponding computer systems, apparatus, and computer programs recorded on one or more computer storage devices, each configured to perform the actions of the methods.

Implementations may include one or more of the following features. The system where the one or more processors are further configured to: generate another second fingerprint if it is determined that the first configuration file mismatches the second configuration file. The system where the one or more processors are further configured to: generate another second fingerprint based on an another configuration file, which is not the second configuration file. The system where the one or more processors are further configured to: generate a first fingerprint based on: a command, a number of commands, a sequence of commands, a configuration of a command, an argument of a command, a parameter of a command, and any combination thereof. The system where the one or more processors are further configured to: generate a second fingerprint based on: commands, number of commands, sequence of commands, a configuration of commands, and any combination thereof. The system where the one or more processors are further configured to: parse the first configuration file to detect code objects, code, commands, and any combination thereof. The system where the one or more processors are further configured to: parse the second configuration file to detect code objects, code, commands, and any combination thereof. The system where the one or more processors are further configured to: detect a cybersecurity object, where the cybersecurity object is associated with a cybersecurity threat. The system where the cybersecurity threat includes any one of: an exposure, a vulnerability, malware, ransomware, spyware, a misconfiguration, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
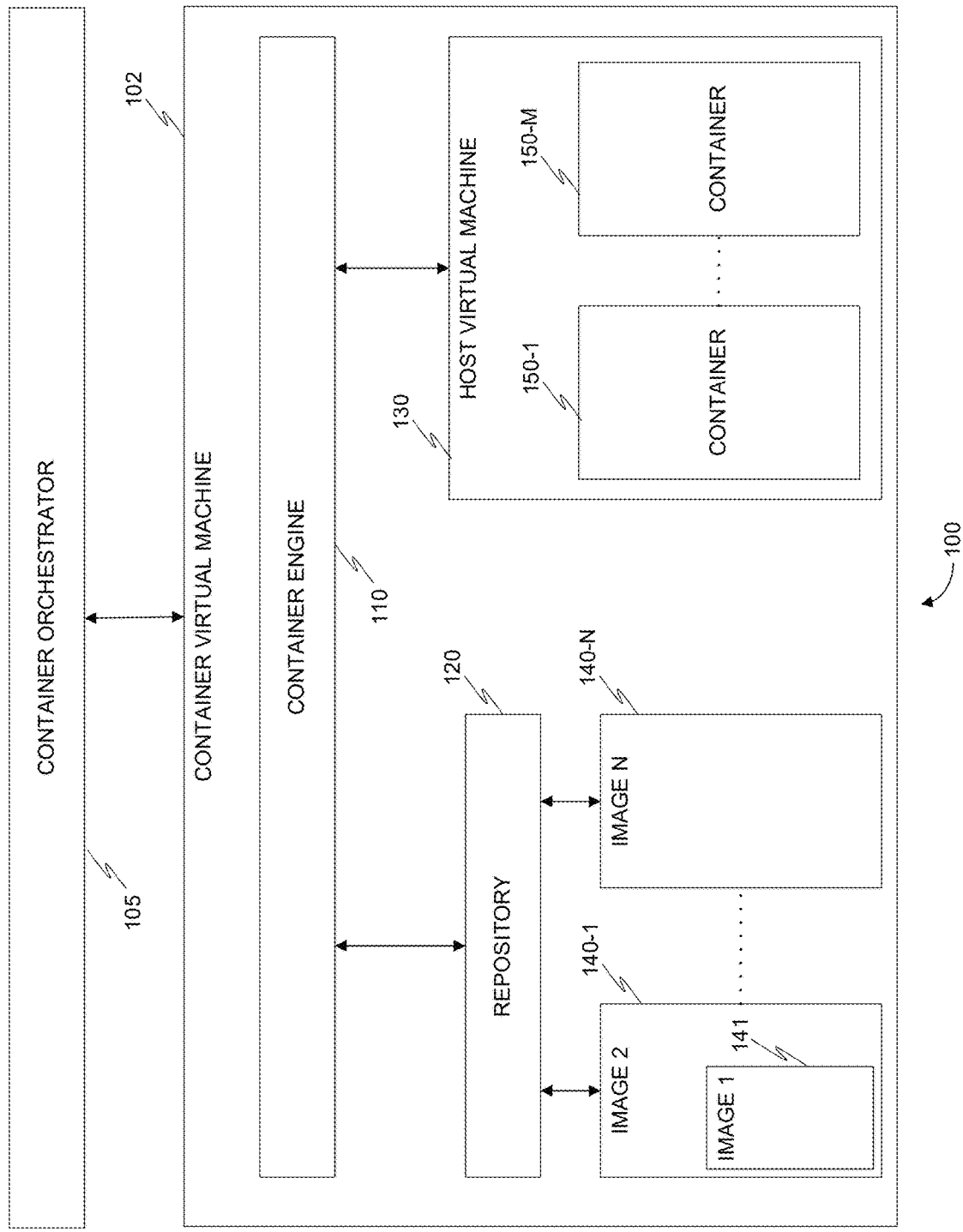
FIG. 1 is a diagram of a container deployment, utilized to describe some of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various example embodiments, disclosed herein, include a system and method for tracing cloud computing environment deployments to code objects utilizing unique fingerprints. In an embodiment, a container is a software package which includes an application and a dependency necessary to run the application. In some embodiments, a dependency is, for example, a library, a binary, and the like.

Therefore, in an embodiment, a container that is virtualized in the operating system allows the container to run anywhere.

In various embodiments, the disclosed system is configured to inspect and analyze container configuration files to detect cybersecurity threats. In an embodiment, the disclosed is configured to detect matches of the container configuration files based on command types, sequence of commands, number of parameters, etc., a combination thereof and the like. In various embodiments, this allows the reduction of the amount of objects which would otherwise be inspected by doing a full inspection of the live container (i.e., inspecting every object in the live container).

In various embodiments, such an inspection not only reduces the use of processing and storage resources for inspection, but also reduces bandwidth devoted by the live container to an inspector, thereby minimizing the effects of performing an inspection on the live container.

FIG. 1 is an example diagram of a container deployment 100, utilized according to an embodiment. A container engine 110 is a software application which is deployed in a cloud computing environment (or infrastructure). In an embodiment, a container engine 110 is configured to receive user input, process input and other communication with a container orchestrator, pull container images from a repository server, generating a mount point from a container image, generating metadata based on a container image, and the like. In certain embodiments, the container engine 110 is further configured to call a container runtime to actually deploy a container from a container image. A container engine may be, for example, Docker®. A container runtime may be, for example, runc.

In an embodiment, the container engine 110 may be deployed in a container virtual machine 102, which is a virtual machine on which a container engine 110 is run. In some embodiments, the container virtual machine is communicatively coupled with a container orchestrator 105. A container orchestrator 105 may be communicatively coupled with a plurality of container virtual machines 102, each container virtual machine 102 running a container engine 110. For example, a container orchestrator 105 may be a Kubernetes® container orchestration system, while the container engine 110 is a Docker® Engine.

The container engine 110 is configured to pull container images which are stored in a repository 120. In an embodiment, the repository 120 is implemented as a storage, and exposed by a server (not depicted) with which the container engine 110 communicates, for example over a network interface, in order to pull container images therefrom, for example based on an image identifier.

A repository 120 may host a plurality of container images, such as container images 140-1 through 140-N, individually referenced as container image 140, generally referenced as container images 140, where 'N' is an integer having a value of '2' or more.

Each container image 140 may in turn include additional container images, which are also referred to as layers. A container image (layer) is generated when a build command is performed on a first container image. For example, a first container image (i.e., a parent image) 141 is generated by a first build command. A second build command causes a second image (i.e., a child image) 140-1 to be generated, which is based on the first container imager 141.

In container deployments, a base image is a container image from which other container images may be generated, and that has no parent image. In an embodiment, a base image includes an operating system, and software tools which allow the installation of software packages or otherwise update the container image. In the example above, the first container image 141 is a base image. A second image 140-1 may include a plurality of layers, which are not shown here for simplicity.

In an embodiment, any one of the container images 140 may be intermediate images, which are sometimes erroneously referred to as base images. Intermediate images are images which include a base image, and also include at least an additional layer which adds functionality to the deployed container. In order to keep the number of layers small, a multi-stage build process may be utilized. For example, in Docker® multiple FROM statements may be used to call different base images, each of which begins a new stage in the build. Objects may be selected from one stage to the next, which allows discarding unselected objects from the final image.

Where a container image 140 may include multiple images, such as container image 140-1 which includes container image 141, a container engine 110 will typically specify a mount point from which the live container is deployed. The container engine 110 may deploy, or may otherwise configure another workload to deploy, a live container. For example, the container engine 110 may configure a host virtual machine (VM) 130 to deploy thereon a plurality of containers 150-1 through 150-M, individually referenced as container 150 and generally referenced as containers 150, where 'M' is an integer having a value of '2' or greater.

In an embodiment, the VM 130 may run a host, such as Red Hat® Enterprise Linux (RHEL) Atomic Host, which runs containerized processes (i.e., containers) provisioning resources from the VM 130. In other embodiments, the host application (e.g., RHEL Atomic Host) may run as a virtual instance in a cloud computing environment, as a local machine (i.e., bare metal) in a network environment, and the like.

In an embodiment, the container engine 110 is further configured to generate diffs. A diff is a term which refers to a difference, in this case a difference between a first container image 141 and a second container image 140-1. A diff may also be generated between a container image 140-N and a live container 150-1 which is deployed based on the container image 140-N. Generation of diffs is discussed in more detail with respect to FIG. 3 below.

Figure 2:
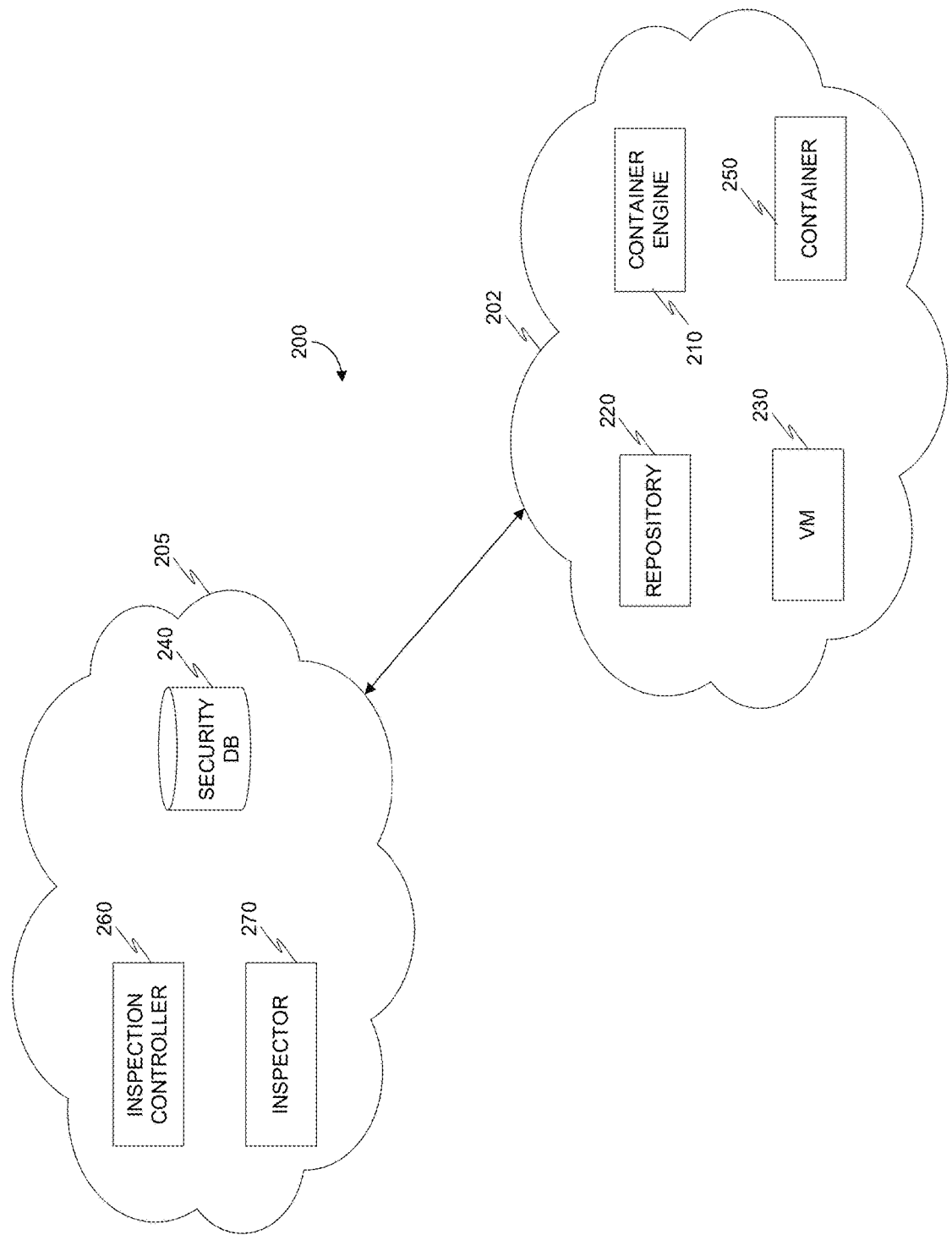
FIG. 2 is a network diagram including a production environment and an inspection environment, utilized to describe an embodiment.

FIG. 2 is an example network diagram 200 including a production environment 202 and an inspection environment 205, utilized to describe an embodiment. A production environment 202 is a cloud computing environment which provides services and resources to client devices. A client device (not shown) may be for example a laptop computer, personal computer, other computing device which is in a network external to the cloud computing environment, and the like. The production environment 202 may be implemented, for example, as a VPC on a cloud computing infrastructure, such as Amazon® Web Services (AWS), Google® Cloud Platform (GCP), Microsoft® Azure, and the like.

In an embodiment, the production environment 202 includes cloud entities, such as resources and principals. A resource is a cloud entity which supplies functionality, such as processing power, memory, storage, communication, and the like. A resource may supply more than one functionality. Resources may include, for example, virtual machines (VMs), such as VM 230, container engines such as container engine 210, serverless functions (not shown), and the like.

In an embodiment, the production environment 202 may further include an application programming interface (API), through which actions in the cloud environment may be triggered. A container engine 210 may be implemented using Kubernetes® or Docker®.

In an embodiment, a serverless function is implemented using Lambda®. In certain embodiments, a VM 230 is implemented using Oracle® VirtualBox, Azure Virtual Machines, and the like. In certain embodiments, the container engine 210 may configure a VM 230 to run a containerized application 250 (also referred to as container 250). The container engine 210 is configured to access a repository 220, such as AWS Elastic Container Registry (ECS), from which an image is pulled and mounted at a mount point to generate a live container, such as container 250.

A principal is a cloud entity which acts on a resource, meaning it can request, or otherwise initiate, actions or operations in the cloud environment which cause a resource to perform a function. A principal may be, for example, a user account, a service account, a role, and the like. In an embodiment, a principal is implemented as a data structure which includes information about an entity, such as a username, a password hash, an associated role, and the like. In an embodiment, a principal may include a privilege which allows the principal to configure the container engine 210 to run a container.

The production environment 202 is connected with an inspection environment 205. The inspection environment 205 is a cloud computing environment. In an embodiment, the inspection environment 205 is deployed on a cloud computing infrastructure shared with the production environment 202, in another cloud computing infrastructure not shared with the production environment 202, or a combination thereof. In certain embodiments, a portion of the inspection environment 205 is deployed in the cloud production environment 202. In some embodiments, certain workloads deployed in the inspection environment 205 may be deployed in the production environment 205. For example, the inspection environment 205 may access a principal, such as a service account, which allows the inspection environment 205 to initiate actions in the production environment 202.

The inspection environment 205 includes a plurality of inspector workloads, such as inspector 270. In an embodiment, the inspector 270 is configured to inspect virtual instances, such as container images, of the production environment 202 for cybersecurity threats. The inspector 270 may inspect a container, a container image, and the like, for security objects, such as secrets, keys, user account information, and the like. In some embodiments, the inspector 270 is configured to inspect the virtual instance for an application, an operating system, a binary file, a library file, a combination thereof, and the like.

The inspection environment 205 further includes a security database 240, which is a graph database. A security graph may be stored on the security database 240. The security graph includes a representation of the production environment 202. For example, cloud entities of the production environment 202 may each be represented as nodes in the security graph. In an embodiment, the security graph is generated based on objects detected by an inspector, such as inspector 270. In certain embodiments, a virtual instance (e.g., a virtual machine) is represented by a node stored in the security graph.

A container, such as container 250, and a corresponding image from which the container was mounted, are also represented each by a node, wherein the node representing the container 250 is connected to a node representing the virtual instance (i.e., VM 230) which runs the container 250. In certain embodiments, generating an instruction to inspect a virtual instance (i.e., container 250) further includes querying a security graph to determine an identifier of a container image represented by a node which is connected to a node representing the container 250.

An inspection controller 260 (also referred to as controller 260) is further included in the inspection environment 205. In an embodiment, the controller 260 is a workload deployed in the inspection environment 205 which is configured to initiate inspection of cloud entities of the production environment 202, such as the cloud entities discussed above. For example, initiating inspection may include determining what cloud entities to inspect, when to inspect them, and the like.

Inspecting virtual instances, such as container 250, is a process which utilizes resources from the production environment 202, such as processing power (measured as I/O per second—IOPS), storage (e.g., for generating a snapshot which is stored and inspected), and the like. Further, while a live container is being inspected, the instance is able to devote less of its own resources to serving its purpose (e.g., providing a service) as those resources are directed in part to the inspection process, such as sending and receiving communication from an inspector 270. Therefore, it is advantageous to reduce this usage to a minimum, while still being able to inspect the entire contents of the container for cybersecurity threats.

In an embodiment, the controller 260 may be configured to instruct the container engine 210 to generate a diff between a first container image, and a second container image. In another embodiment, the controller 260 may be configured to instruct the container engine 210 to generate a diff between a live container (i.e., container 250) and an image from which the live container was deployed. The controller 260 may be further configured to instruct an inspector 270 to inspect, for example, objects which are part of the diff results, as well as image from which the live container was deployed. This is discussed in more detail with respect to FIG. 3 below.

Figure 3:
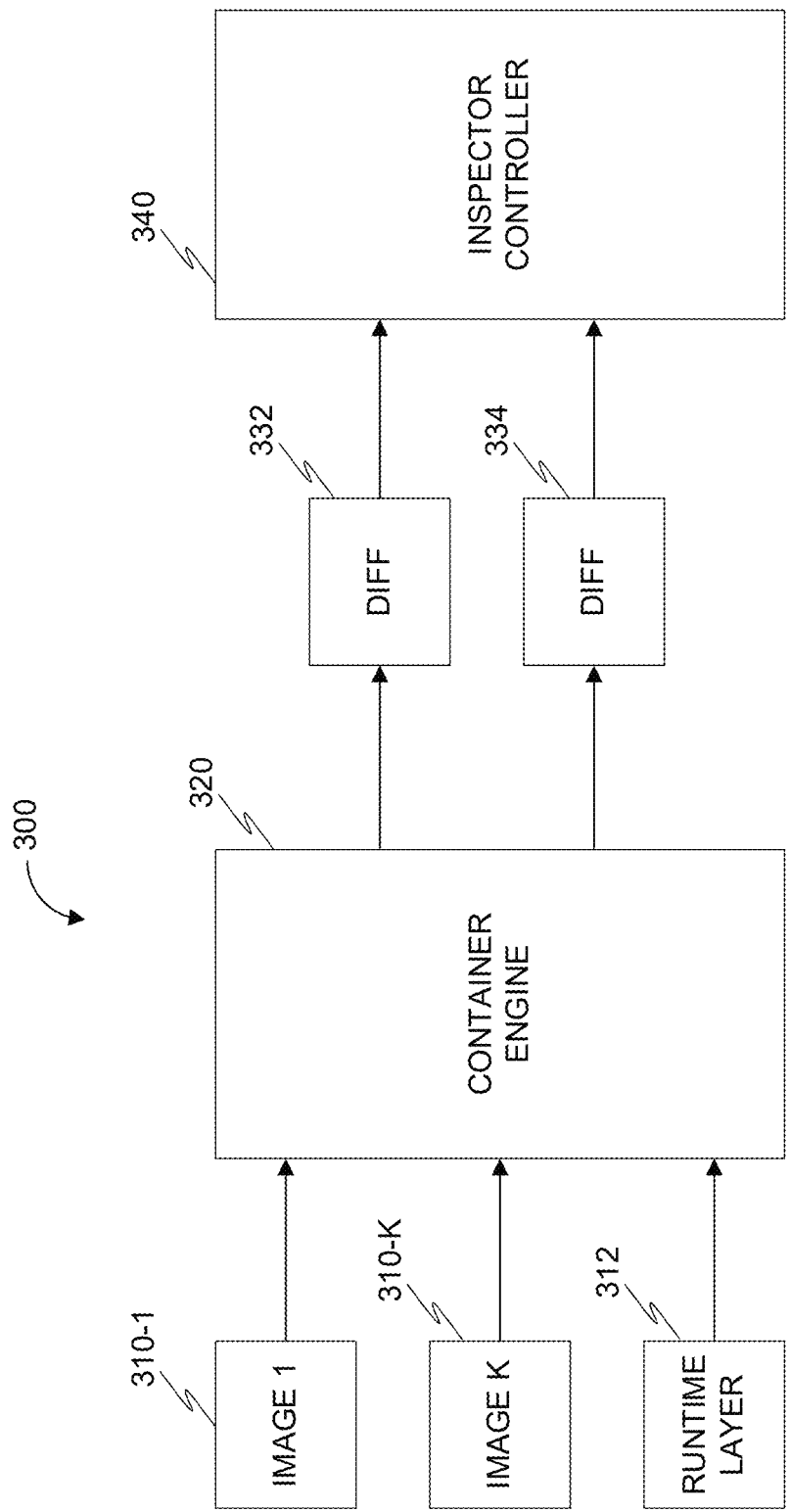
FIG. 3 is a schematic illustration of a diff generation flow, utilized to describe an embodiment.

FIG. 3 is an example schematic illustration of a diff generation flow 300, utilized to describe an embodiment. A container engine 320, such as the Docker® engine, is configured to receive an instruction to generate a diff between a first container image and a second container image. In an embodiment, a container image (other than a base image) includes a plurality of container layers. Each container layer is a container image in and of itself. Each container layer corresponds to an instruction stored in a build file, such as a Dockerfile® for the Docker® engine. Build files may be generated according to standards governed by the Open Container Initiative (OCI), which allows for build files, container images, and the like, to be easily transferred between systems.

A build file may include a plurality of build instructions, such as RUN, ADD, and COPY. Each such instruction, when executed by a container engine, generate a container layer, also known as an intermediate layer. Intermediate layers are read-only layers, as any modification results in generation of a new layer. The top layer of a container image is also known as the container layer, upper layer, runtime layer, and so on., and is a layer which can be written to.

In an embodiment, the container engine 320 may receive input from a command line in the form of instructions. For example:

container-diff diff --type=apt --type=file image1 imageK when executed in the command line, will generate a diff 332. The diff 332 generated based on the above command includes objects and object identifiers, such as what operating system (OS) packages are installed, and what files have been added, deleted, or changed, between image1 310-1 and imageK 310-K. For example, an object may be a file, and a corresponding object identifier may include a directory path (or address) where the object is stored, and a file name or other identifier to identify the file within the directory.

The container-diff command is a GitHub® project which was created by Google®. It is noted that this example of a diff generating command is presented here merely for pedagogical purpose, and that another similar command, or group of commands, or equivalent command or group of commands, may be utilized within the scope of this disclosure. As another example, the container engine is configured to generate a diff 334 between a runtime layer 312 and an image layer 310-K, from which the runtime layer 312 was generated.

In an embodiment the diff outputs 332 and 334 are read by an inspector controller 340. The inspector controller 340 may be implemented as the inspection controller 260 of FIG. 2 above. The inspector controller 340 is configured to receive a diff file and is configured to generate instructions which when executed configure an inspector, such as the inspector 270 of FIG. 2 to inspect a container image, and an object which is selected from the diff output, wherein the diff output is partially based on the container image.

For example, the inspector controller 340 is further configured to receive the diff output 334 generated between runtime layer 312 and imageK 310-K. The diff output 334 includes, in this example, an object which corresponds to a file which was added in the runtime layer 312, and does not appear in the imageK 310-K. The inspector controller 340 is then configured to generate instructions which, when executed, configure an inspector to inspect the imageK 310-K and inspect the object from the diff output 334. By accessing only the object from the diff output 334, instead of inspecting the entire runtime layer 312, resource usage is reduced as explained above, and redundant inspections are eliminated.

As another example, the inspector controller 340 is configured to receive the diff output 332 generated between imageK 310-K and image1 310-1, upon which imageK 310-K is based. The diff output 332 includes, in this example, an object which corresponds to an installation package which was added to imageK 310-K, and does not appear in the image1 310-1. The inspector controller 340 is configured to generate instructions which, when executed, configure an inspector to inspect the image1 310-1 and inspect the object from the diff output 332. By accessing only the object from the diff output 332, instead of inspecting the entire imageK 310-K, resource usage is reduced as explained above, redundant inspections are eliminated, and where a cybersecurity threat is detected, it is possible to associate it exactly with a layer identifier.

Figure 4:
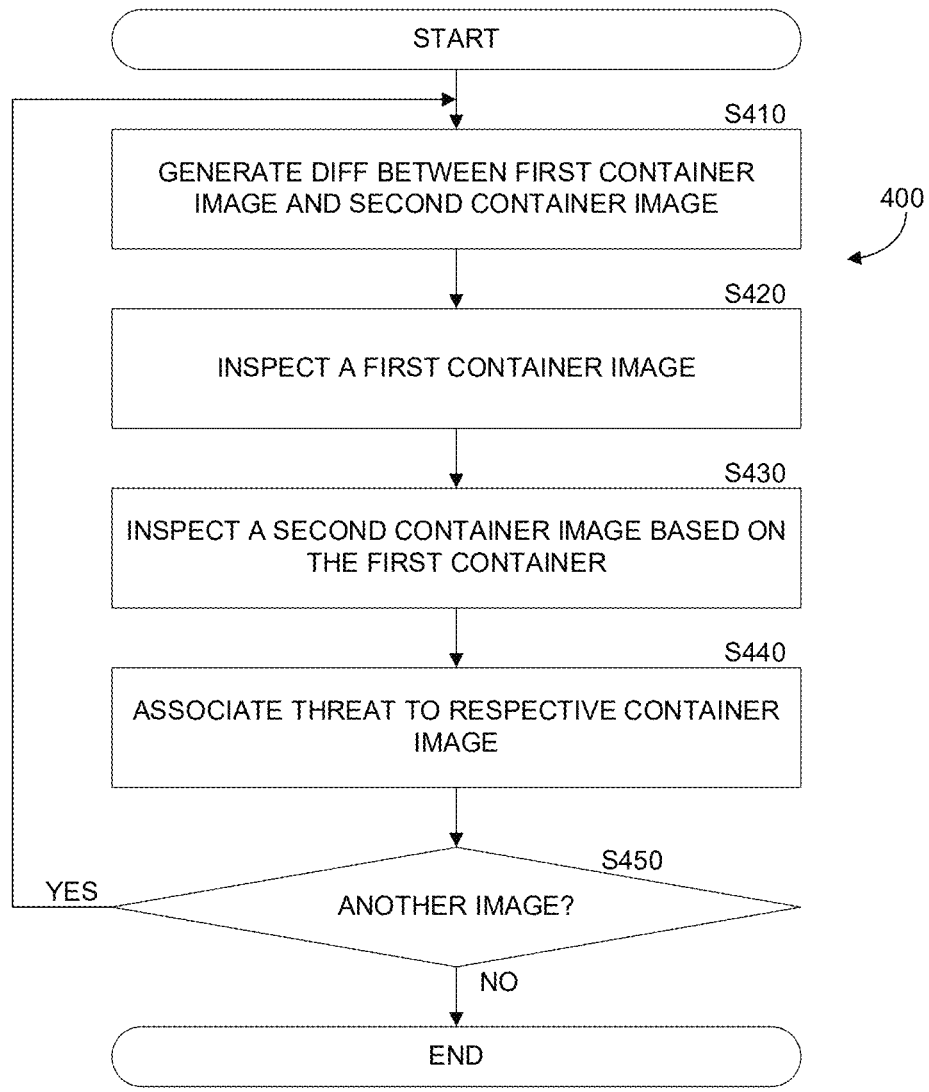
FIG. 4 is a flowchart for reducing redundancy in inspecting container layers for cybersecurity threats, implemented in accordance with an embodiment.

FIG. 4 is an example flowchart 400 for reducing redundancy in inspecting container layers for cybersecurity threats, implemented in accordance with an embodiment.

At S410, a diff output is generated between a first container image and a second container image. The first container image and the second container image are a part of a container build. In an embodiment, the second container image is based off the first container image. The first container image may be based off a base image, for example. In some embodiments, a diff output is generated by generating an instruction for a container engine, which when executed by the container engine generates the diff output. An example of such an instruction is included above in FIG. 3.

In an embodiment, a diff output includes objects and object identifiers, such as what operating system (OS) packages are installed, and what files have been added, deleted, or changed, between the first container image and the second container image. For example, an object may be a file, and a corresponding object identifier may include a directory path (or address) where the object is stored, and a file name or other identifier to identify the file within the directory. In some embodiments, a container repository, such as ECS, is accessed to pull container images therefrom.

At S420, the first container image is inspected for a cybersecurity threat. In an embodiment, the first container image may be inspected for other objects having a cybersecurity interest (also referred to as security objects). In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspection may be performed for security objects, such as files, folders, and the like. A security object may be, for example, a password stored in plaintext, a password stored in cleartext, a certificate, and the like. As another example, in an embodiment, a signature for a file, a folder, and the like is generated during an inspection. Such a signature is matched to another known signature. The known signature indicates a vulnerability. The signature may be generated, for example, using a checksum. In this example, a file having a checksum corresponding to a certain predetermined value is determined to have a predetermined known vulnerability.

At S430, the second container image is inspected for a cybersecurity threat. The second container image is based on the first container image, i.e., the first container image is a layer of the second container image. In order to efficiently inspect the second container image, objects are identified from the diff output. In an embodiment, inspecting the second container image includes identifying objects from the diff output, and inspecting at least a portion of the objects from the diff output. In certain embodiments, an object from the diff output may be inspected for a security object. A security object may be, for example, a file, a folder, a password stored in plaintext, a password stored in cleartext, a certificate, and the like.

At S440, a detected cybersecurity threat is associated with a container image. In an embodiment, a detected security object is associated with the container image. Associating a cybersecurity threat with a container image includes, in an embodiment, generating in a security graph a node representing the cybersecurity threat, a node representing the container image, and generating an edge connected the cybersecurity threat node to the container image node.

In certain embodiments, the detected cybersecurity threat is associated with a container image in response to detecting that the cybersecurity threat is detected in the inspected container image and is not detected in a container layer which is under the inspected container image. In the example of FIG. 1 above, if a cybersecurity threat is detected in first image 141 and not in second image 140-1, the detected cybersecurity threat is associated only with the first image 141.

In some embodiments, two container layers may be completely inspected. In such embodiments, if a cybersecurity threat is detected in a bottom image (layer) and not a top image (layer), the cybersecurity threat is associated with the bottom image. If the cybersecurity threat is detected in the top image and not detected in the bottom image, the cybersecurity threat is associated with the top image. If the cybersecurity threat is detected in both images, the cybersecurity threat is associated with the bottom image, as the top image includes the bottom image. In such embodiments, the detected cybersecurity threat is the same cybersecurity threat for both layers.

At S450, a check is performed to determine if another image should be inspected. If 'yes' execution may continue at S410, by selecting another image and generating a diff between the another image and one of the first container image or the second container image. If 'no', execution terminates.

By inspecting a bottom layer, and objects from a diff output generated between the bottom layer and an upper layer, redundant inspection is reduced, since the bottom layer is included as part of the upper layer.

Figure 5:
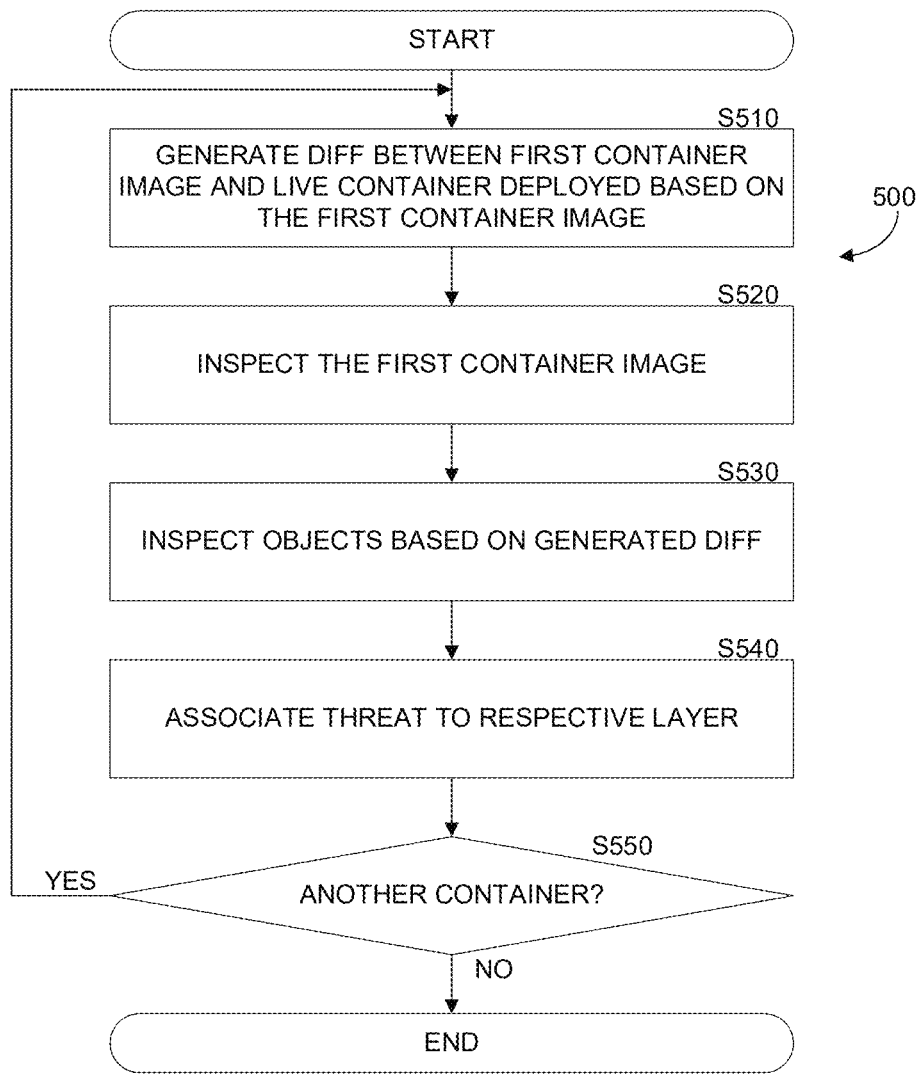
FIG. 5 is a flowchart of a method for reducing redundancy in inspecting a live container for cybersecurity threats, implemented in accordance with an embodiment.

FIG. 5 is an example flowchart 500 of a method for reducing redundancy in inspecting a live container for cybersecurity threats, implemented in accordance with an embodiment. Throughout this disclosure reference is made to inspecting containers, container images, layers, and the like for cybersecurity threats. It is noted in this regard that inspection for other objects of cybersecurity interest (i.e., security object) is also within the scope of this disclosure, whether or not such objects are directly considered a threat. For example, a vulnerability, an exposure, a misconfiguration, a malware object, a cryptocurrency miner, and the like, is a cybersecurity threat, while an OS, an application, a user account, and the like, are examples of security objects which are of cybersecurity interest, and may also be inspected for by an inspector.

At S510, a diff output is generated between a first container image and a live container. The live container (also known as a runtime layer) is deployed from a mount point of the first container image. In an embodiment, the first container image includes a plurality of layers. The first container image may be based off a base image, for example. In some embodiments, a diff output is generated by generating an instruction for a container engine, which when executed by the container engine generates the diff output. An example of such an instruction is included above in FIG. 3.

In an embodiment, a diff output includes objects and object identifiers, such as what operating system (OS) packages are installed, and what files have been added, deleted, or changed, between the first container image and the live container. For example, an object may be a file, and a corresponding object identifier may include a directory path (or address) where the object is stored, and a file name or other identifier to identify the file within the directory. In some embodiments, a container repository, such as ECS, is accessed to pull a container image therefrom. In certain embodiments, a host VM may be accessed to read the container image (i.e., the live container) stored in a local cache of the host VM.

At S520, the first container image is inspected for a cybersecurity threat. In an embodiment, the first container image may be inspected for other objects having a cybersecurity interest (also referred to as security objects). In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspection may be performed for security objects, such as files, folders, and the like. A security object may be, for example, a password stored in plaintext, a password stored in cleartext, a certificate, and the like. As another example, in an embodiment, a signature for a file, a folder, and the like is generated during an inspection. Such a signature is matched to another known signature. The known signature indicates a vulnerability. The signature may be generated, for example, using a checksum. In this example, a file having a checksum corresponding to a certain predetermined value is determined to have a predetermined known vulnerability.

At S530, an object based on the generated diff is inspected for a cybersecurity threat. In order to efficiently inspect the live container, objects are identified from the diff output. In an embodiment, inspecting the live container includes identifying objects from the diff output, and inspecting at least a portion of the objects from the diff output for cybersecurity threats. In certain embodiments, an object from the diff output may be inspected for a security object. A security object may be, for example, a file, a folder, a password stored in plaintext, a password stored in cleartext, a certificate, and the like.

At S540, a detected cybersecurity threat is associated with a layer. In an embodiment, a detected security object is associated with the layer. A layer may be any one of the container image (i.e., container layer) or the live container (i.e., runtime layer). Associating a cybersecurity threat with a layer includes, in an embodiment, generating in a security graph a node representing the cybersecurity threat, a node representing the container layer, and generating an edge connected the cybersecurity threat node to the container layer node.

In certain embodiments, the detected cybersecurity threat is associated with a container layer in response to detecting that the cybersecurity threat is detected in the runtime layer and is not detected in the container layer from which the runtime layer was deployed. In the example of FIG. 1 above, if a cybersecurity threat is detected in image 140-N and not in container 150-1 which was deployed therefrom, the detected cybersecurity threat is associated only with the image 140-N.

At S550, a check is performed to determine if another container should be inspected. If 'yes' execution may continue at S510, by selecting another container image and generating a diff between the another container image and a runtime layer of a live container. If 'no', execution terminates.

By inspecting the first container image, and objects from a diff output generated between the first container image and a runtime layer of a live container, redundant inspection is reduced, since the first container image is included as part of the runtime layer.

Figure 6:
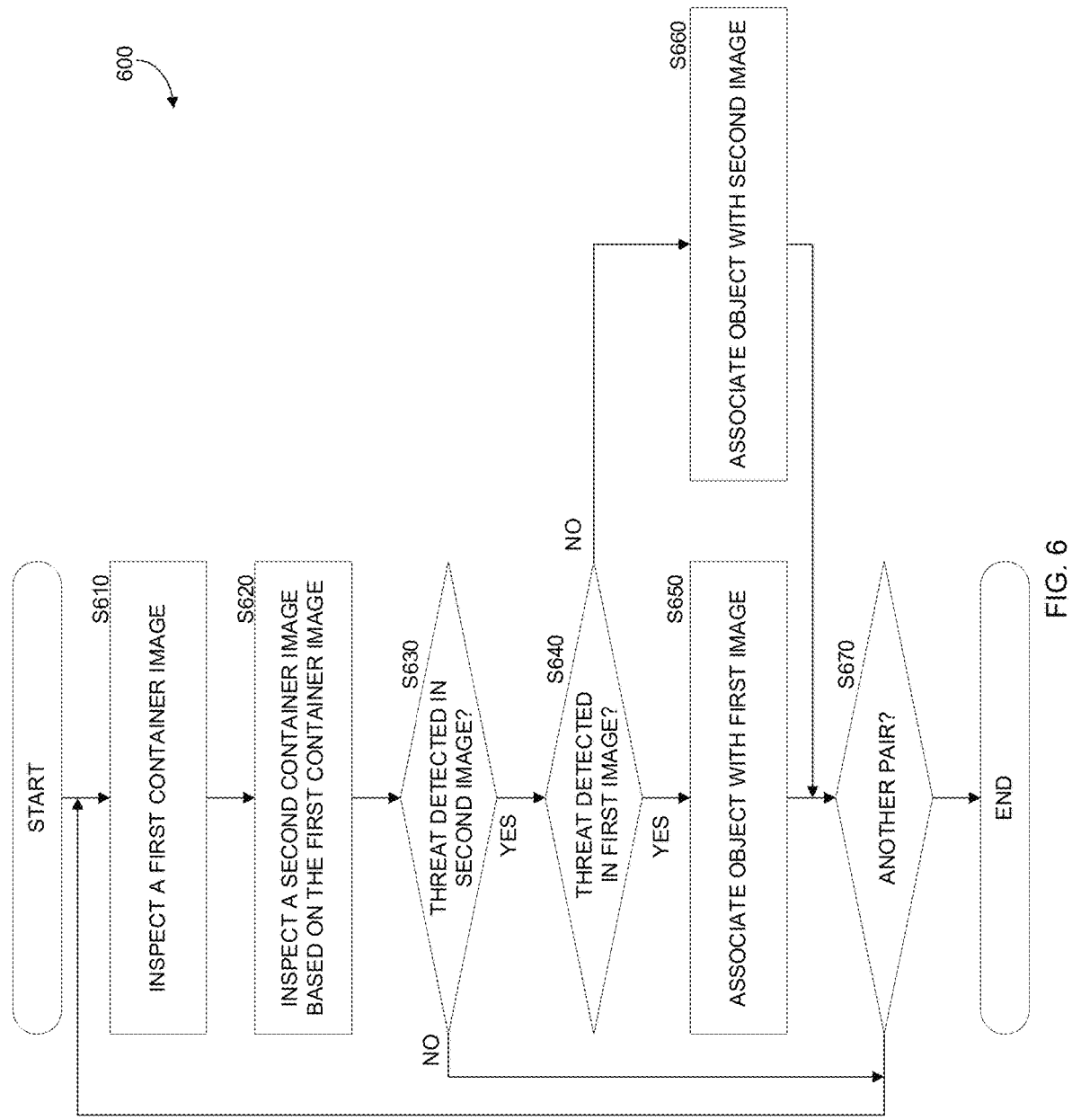
FIG. 6 is a flowchart of a method for layer by layer inspection of an operating system level virtualization, implemented in accordance with an embodiment.

FIG. 6 is an example flowchart 600 of a method for layer by layer inspection of an operating system level virtualization, implemented in accordance with an embodiment.

At S610, a first container image is inspected. A container, as explained above, is an operating system-level virtualization which includes an application and a dependency which is required to run the application. In an embodiment, the first container image is inspected for any one of: a cybersecurity object, and a cybersecurity threat. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspection may be performed for security objects, such as files, folders, and the like. A security object may be, for example, a password stored in plaintext, a password stored in cleartext, a certificate, and the like. As another example, in an embodiment, a signature for a file, a folder, and the like is generated during an inspection. Such a signature is matched to another known signature. The known signature indicates a vulnerability. The signature may be generated, for example, using a checksum. In this example, a file having a checksum corresponding to a certain predetermined value is determined to have a predetermined known vulnerability.

At S620, a second container image, which is previously generated based on the first container image, is inspected. The second container image is a container layer which is above the first container image. In an embodiment, the first container image is a base layer, and the second container image is an upper layer. In certain embodiments, the second container image is a next consecutive layer respective of the first container image. A container image is generated as the result of execution of a build instruction executed by, for example, a container engine. In an embodiment, the first container image is a read-only image.

At S630, a check is performed to determine if a threat was detected in the second container image. In some embodiments, the check is performed to determine if a cybersecurity object is detected, which is not a cybersecurity threat. If 'no', execution continues at S670. If 'yes' execution continues at S640.

At S640, a check is performed to determine if the threat was detected in the first container image. In some embodiments, the check is performed to determine if a cybersecurity object is detected, which is not a cybersecurity threat. If 'no', execution continues at S660. If 'yes', execution continues at S650.

At S650, the detected object is associated with the first container image. If a security object is detected in both images, then the origin of the object is in the first container image. This is due to the second container image including all the objects of the first container image, and any subsequent changes.

Therefore, a security object, security threat, and the like, which appears in both layers, should be associated with the preceding layer, rather than the superseding layer, as the origin of the object must be in the preceding layer. In certain embodiments, where multiple layers, i.e., more than two, are inspected, an object is associated with the lowest layer in which the object is detected. For example, if an object is detected in a second layer, third layer, and fourth layer, but not in a first layer (where the first layer is a base image, and the fourth layer is the runtime layer), then the object should be associated with the second layer, as all superseding layers include therein the second layer.

In certain embodiments, associating a cybersecurity threat (or other object) with a layer includes generating in a security graph a node representing the cybersecurity threat, a node representing the container layer, and generating an edge connected the cybersecurity threat node to the container layer node.

At S660, the detected object is associated with the second container image. If a security object is detected in the second container image but not the first container image, then the origin of the object is in the second container image. This is due to the second container image including all the objects of the first container image, and any subsequent changes. Therefore, a security object, security threat, and the like, which appears in the second container image but not the first container image, should be associated with the superseding layer, rather than the preceding layer, as the origin of the object must be in the superseding layer.

In certain embodiments, where multiple layers, i.e., more than two, are inspected, an object is associated with the highest layer in which the object is detected. For example, if an object is detected in a third layer, but not a second layer or first layer (where the first layer is a base image, and the third layer is the runtime layer), then the object should be associated with the third layer, as all preceding layers do not include therein the cybersecurity threat.

In certain embodiments, associating a cybersecurity threat (or other object) with a layer includes generating in a security graph a node representing the cybersecurity threat, a node representing the container layer, and generating an edge connected the cybersecurity threat node to the container layer node.

Figure 7:
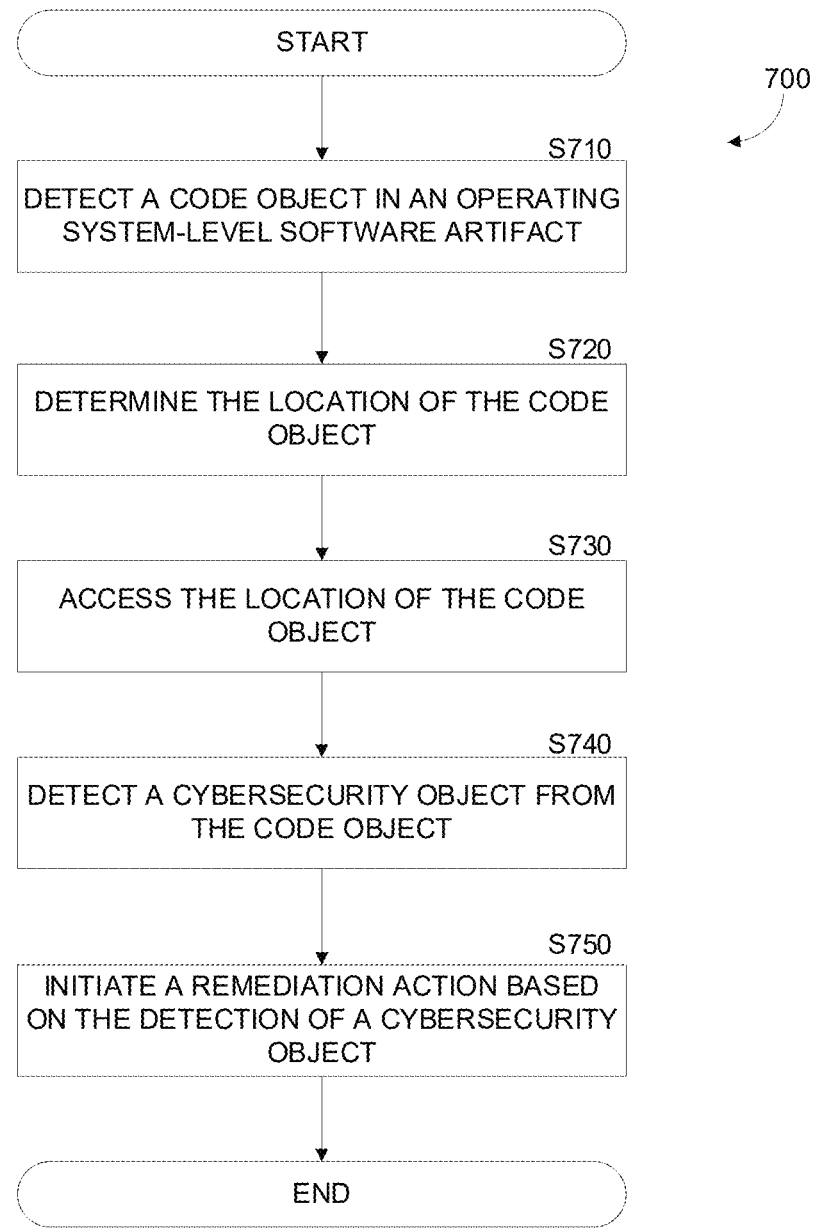
FIG. 7 is a flowchart of a method for detecting a cybersecurity object in an operating system-level virtualization software artifact, implemented in accordance with an embodiment.

FIG. 7 is an example flowchart 700 of a method for tracing cloud objects to code objects by detecting a cybersecurity object in an operating system-level virtualization software artifact, implemented in accordance with an embodiment. In some embodiments, a computing environment, such as a cloud computing environment, includes a plurality of code objects, for example, objects that are stored in a version control system (VCS). An example of such a VCS is implemented utilizing Github®.

Inspecting each of the plurality of code objects is resource consuming. Therefore, it is advantageous to trace deployed code, such as software containers, back to a code object, then inspect only the code objects which correspond to virtualization instances, cloud objects, and the like, which are deployed in the cloud computing environment. This reduces the amount of resources, such as processor utilization, memory utilization, etc., as less code objects are required to be inspected, while still maintaining a reasonable level of security.

At S710, a code object is detected. In an embodiment, the code object is detected in a software artifact of an operating system-level virtualization. An operating system-level virtualization is also known as a software container, implemented, for example, by a software container platform, such as Docker®, Kubernetes®, and the like.

In an embodiment, an identifier of a code object is detected in an operating system-level virtualization software artifact. In various embodiments, a code object is executable code, declaratory code, machine-executable code, and the like. In some embodiments, a software artifact includes a container image, such as a Docker® image, a container configuration file, a Dockerfile®, a log, a metadata, and the like, related to the software container creation and execution, etc., a combination thereof, and the like.

In various embodiments, an inspection controller is configured to access a software artifact of a software container deployed in a production environment (e.g., a cloud computing environment). In some embodiments, the inspection controller is configured to inspect a software artifact for at least a code object. In certain embodiments, the inspection controller is configured to inspect software artifacts by parsing and analyzing sections of code to detect code objects.

At S720, a location of the code object is determined. In various embodiments, the inspection controller is configured to determine the location of the detected code object. In some embodiments, the inspection controller is configured to determine the location of the detected code object by detecting a location in a container image, a Docker® image, a container configuration file, a Dockerfile®, etc., a combination thereof, and the like. In some embodiments, the location is stored as a regex in such a file.

In an embodiment, the inspection controller is configured to detect the location of the code object in a command instruction of the container configuration file (e.g., a Dockerfile®). For example, in an embodiment, if a command instruction states, "COPY.src/app/src", the "src" directory is located in the "/app/src" file inside the container.

In various embodiments, the inspection controller is configured to determine the location of the detected code objects by detecting a specific path location of the code object in a container environment variable, in a container configuration file (e.g., a Dockerfile®), a combination thereof, and the like. In some embodiments, the inspection controller is configured to initialize inspection of a container image (e.g., a Docker® image) to determine where the code objects are located.

In an embodiment, the location is a network storage, a cloud computing storage, a version control system, a code repository, a combination thereof, and the like.

At S730, the location of the code object is accessed. In various embodiments, the inspection controller is configured to access the determined location of the code object. In various embodiments, the inspection controller is configured to authenticate provided credentials to access the location of the code object. In certain embodiments, the inspection controller is configured to utilize an authentication token for accessing the location of the code object.

In some embodiments, the code object is extracted from the location in which the code object is stored. In an embodiment, an inspection controller is configured to provide access to the code object, to a copy of the code object, etc., to an inspector. According to an embodiment, the inspector is configured to inspect the code object, for example utilizing static analysis, for a cybersecurity object.

At S740, a cybersecurity object is detected in the code object. In various embodiments, the inspection controller is configured to assign an inspector to inspect the code object for a cybersecurity object. In an embodiment, the inspector is configured to detect a cybersecurity object that is associated with a cybersecurity threat. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

In an embodiment, a cybersecurity threat is indicated by a plurality of cybersecurity objects, i.e., a toxic combination of a plurality of cybersecurity objects. In some embodiments, the plurality of cybersecurity objects includes a cybersecurity object of a first type (e.g., a weak password), and a cybersecurity object of a second type (e.g., a misconfiguration).

At S750, a remediation action is initiated. In an embodiment, the remediation action is initiated based on the detection of a cybersecurity object. In an embodiment, the inspection controller is configured to initiate a remediation action in response to detecting a cybersecurity object in a code object associated with a software artifact of an operating system-level virtualization deployed in a cloud computing environment. In some embodiments, the inspection controller is configured to generate a remediation action to remediate a cybersecurity threat indicated by the cybersecurity object. In certain embodiments, a remediation action includes any one of: removing a vulnerable container image (e.g., a Docker image), implementing a network policy to isolate a software container, restricting a capability of an exposed software container, restoring a backup of software container data, initiating recovery of a software container, authenticating a software container image, a combination thereof, and the like.

Figure 8:
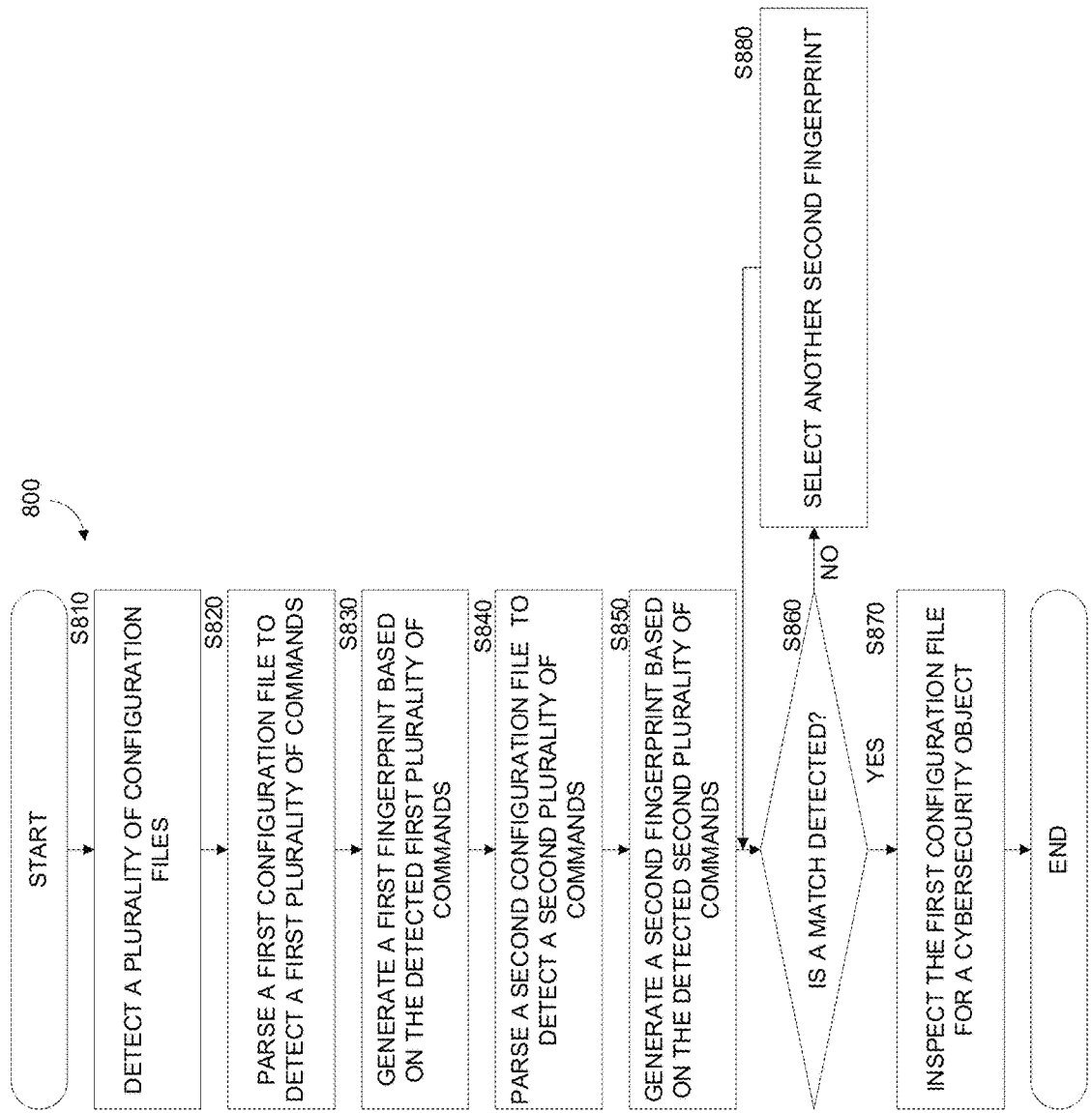
FIG. 8 is a flowchart of a method for improving inspection of software containers utilizing fingerprints, implemented in accordance with an embodiment.

FIG. 8 is an example flowchart 800 of a method for improving inspection of software containers utilizing fingerprint matching, implemented in accordance with an embodiment. Inspecting software containers for cybersecurity objects is challenging as containers provide a dynamic environment and consist of complex architectures, that create difficulties for threat detection. Therefore, it is advantageous to detect configuration files of a software container, determine whether the configuration files match based on the fingerprints of each file, and then inspect a single software container (or a number of containers less than the total number of containers) those matching configuration files. This reduces the amount of resource usage, such as processor utilization, memory utilization, etc., as it narrows down the plurality of configuration files of the container that are required to be inspected.

At S810, a plurality of configuration files is detected. In an embodiment, a configuration file is a software container configuration file that is utilized to generate an Operating System-level virtualization. In some embodiments, a configuration file is a Dockerfile®, which is a file that includes code, code objects, commands, a combination thereof, and the like. In an embodiment, the inspection controller is configured to assign an inspector which is configured to inspect the code, code objects, commands, a combination thereof, and the like, which is utilized to build a software container image (e.g. Docker® image). In various embodiments, the inspection controller, the inspector, and the like, is configured to detect the plurality of configuration files.

At S820, a first configuration file is parsed. In an embodiment, a first configuration file is parsed to detect a first plurality of commands. In some embodiments, a first configuration file of the plurality of configuration files is selected for inspection. In some embodiments, a plurality of first configuration files is parsed. In some embodiments, a configuration file (e.g., a container configuration file) is a Dockerfile®, which is a file that includes code, code objects, commands, etc., a combination thereof, and the like.

In an embodiment, commands are instructions located in the container configuration file which define the steps of building a container image. For example, in an embodiment, "FROM ubuntu: 24.05" is a command instruction that specifies that the base image must be used to generate a new container image. Other commands, in some embodiments, include, "FROM", "RUN", "COPY", "ADD", a combination thereof, and the like.

In some embodiments, the first configuration file is parsed to detect the code objects, code, commands, a combination thereof, and the like. In some embodiments, a specific command, a specific command type, and the like, is detected in the first configuration file.

At S830, a first fingerprint is generated. In some embodiments, a first fingerprint is generated based on the detected first plurality of commands. In an embodiment, the inspection controller is configured to generate the first fingerprint.

In various embodiments, a first fingerprint is associated with a configuration file. In some embodiments, a first fingerprint is an identifier which is generated based on the configuration of commands, e.g., a number of commands, a type of each command, an order of the commands in the configuration file, a sequence of commands, a combination of a command, and a parameter of that command, a combination thereof, and the like. In various embodiments, a first fingerprint is an identifier based on the configuration of the detected plurality of commands in a configuration file.

In an embodiment, a command type refers to commands that are identical, commands that provide the same function, commands that provide the same action, etc.

For example, in an embodiment, commands that are the same type include identical commands such as "COPY./app" and "COPY./file6". For example, in an embodiment, commands that are the same command type include, "COPY./configfile3" and "ADD https://sample6.com/file.24/app7", as both of these commands provide a similar function of adding files, Uniform Resource Locators (URLs), etc., a combination thereof, and the like, into container images.

At S840, a second configuration file is parsed. In an embodiment, a second configuration file is parsed to detect a second plurality of commands. In some embodiments, a second configuration file of the plurality of configuration files is selected for inspection. In some embodiments, a plurality of second configuration files is parsed.

In some embodiments, a configuration file (e.g., a container configuration file) is a Dockerfile®, which is a file that includes code, code objects, commands, etc., a combination thereof, and the like.

In an embodiment, commands are instructions located in the container file which define the steps of building a container image. For example, in an embodiment, "FROM ubuntu: 24.05" is a command instruction that specifies that the base image must be used to generate a new container image. Other commands, in some embodiments, include, "FROM", "RUN", "COPY", "ADD", etc., a combination thereof, and the like.

In some embodiments, the second configuration file is parsed to detect the code objects, code, commands, a combination thereof, and the like. In some embodiments, a specific command, a specific command type, and the like, is detected in the first configuration file.

At S850, a second fingerprint is generated. In an embodiment, a second fingerprint is generated based on the detected second plurality of commands. In various embodiments, the inspection controller is configured to generate the second fingerprint.

In various embodiments, a second fingerprint is associated with a configuration file. In some embodiments, a second fingerprint is an identifier which is generated based on the configuration of commands, e.g., a number of commands, a type of each command, an order of the commands in the configuration file, a sequence of commands, a combination of a command, a parameter of that command, a combination thereof, and the like. In various embodiments, a second fingerprint is an identifier based on the configuration of the detected plurality of commands in a configuration file.

In an embodiment, a command type refers to commands that are identical, commands that provide the same function, provide the same action, etc.

For example, in an embodiment, commands that are the same type include identical commands such as "COPY./app" and "COPY./file7". For example, in an embodiment, commands that are the same command type include, "COPY./configfile3" and "ADD https://sample6.com/file.24/app7", as both of these commands provide a similar function of adding files, Uniform Resource Locators (URLs), etc., a combination thereof, and the like, into container images.

At S860, a check is performed to determine if a match is detected. If 'YES' where a match is detected, according to an embodiment, execution continues at S870. In some embodiments, where a mismatch is detected (i.e. a match is not detected), execution continues at S880, with another second fingerprint, where the another second fingerprint is generated based on another configuration file (e.g. Dockerfile®), which is not the second configuration file.

At S870, the first configuration file is inspected. It is advantageous, in an embodiment to inspect the first configuration file after a match is detected because in detecting matching configuration files the plurality of configuration files of a container are narrowed down for inspection. In an embodiment, this reduces the amount of resource usage, such as processor utilization, memory utilization, storage utilization, required to inspect the configuration files of a container.

In an embodiment, the first configuration file is inspected for a cybersecurity object. In various embodiments, in response to a detected match, the inspection controller is configured to trigger the inspection of the first configuration file. In some embodiments, a cybersecurity object is associated with a cybersecurity threat. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

In an embodiment, in response to detecting a cybersecurity object in the first configuration file, a remediation action is initiated. In some embodiments, the inspection controller is configured to generate a remediation action to remediate a cybersecurity threat indicated by the cybersecurity object. In some embodiments, a remediation action includes removing a vulnerable container file or container image, implementing a network policy to isolate a software container, restricting the capability of an exposed container, restoring backup of data from a container, initiating recovery of a software container, a combination thereof, and the like.

Figure 9:
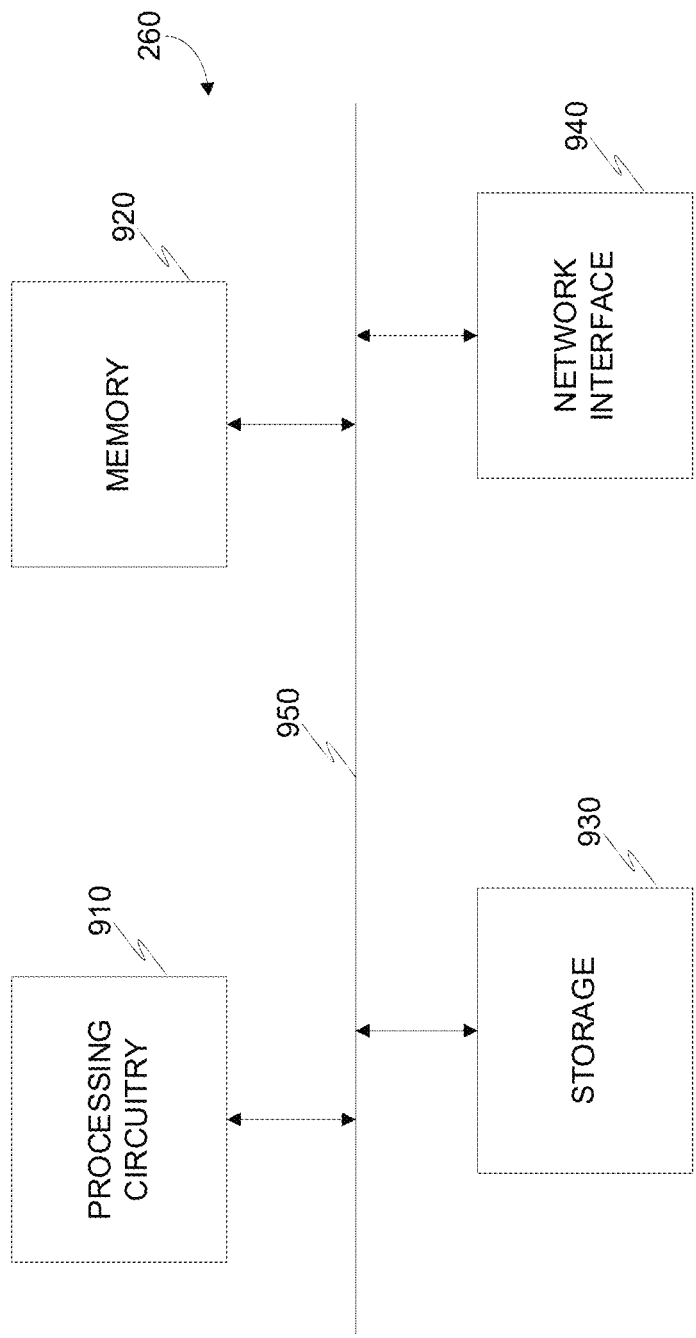
FIG. 9 is a schematic diagram of an inspection controller, according to an embodiment.

FIG. 9 is an example schematic diagram of an inspection controller 260 according to an embodiment. The inspection controller 260 includes a processing circuitry 910 coupled to a memory 920, a storage 930, and a network interface 940. In an embodiment, the components of the inspection controller 260 may be communicatively connected via a bus 950.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 920 may be volatile (e.g., random access memory, etc.), non-volatile (e.g., read only memory, flash memory, etc.), or a combination thereof.

In one configuration, software for implementing one or more embodiments disclosed herein may be stored in the storage 930. In another configuration, the memory 920 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, cause the processing circuitry 910 to perform the various processes described herein.

The storage 930 may be magnetic storage, optical storage, and the like, and may be realized, for example, as flash memory or other memory technology, or any other medium which can be used to store the desired information.

The network interface 940 allows the inspection controller 260 to communicate with, for example, a security database 240, an inspector 270, a container engine 210, and the like.

It should be understood that the embodiments described herein are not limited to the specific architecture illustrated in FIG. 9, and other architectures may be equally used without departing from the scope of the disclosed embodiments. Similarly, the architecture illustrated in FIG. 9 may be utilized in deploying an inspector 270, a container engine 210, a virtual machine 230, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for improving inspection of software containers deployed in a cloud computing environment, comprising:
    detecting a plurality of configuration files, each configuration file corresponding at least to a software container image, the software container image corresponding to a software container deployed in the cloud computing environment;
    parsing a first configuration file of the plurality of configuration files to detect a first plurality of commands;
    generating a first fingerprint based at least on the detected first plurality of commands;
    parsing a second configuration file of the plurality of configuration files to detect a second plurality of commands;
    generating a second fingerprint based at least on the detected second plurality of commands;
    determining that the first configuration file matches the second configuration file in response to detecting a match based on the first fingerprint and the second fingerprint;
    determining that the first configuration file mismatches the second configuration file in response to detecting a mismatch based on the first fingerprint and the second fingerprint; and
    inspecting the first configuration file for a cybersecurity object in response to determining that the first configuration file matches the second configuration file.

2. The method of claim 1, further comprising:
    generating another second fingerprint when it is determined that the first configuration file mismatches the second configuration file.

3. The method of claim 2, further comprising:
    generating another second fingerprint based on an another configuration file, which is not the second configuration file.

4. The method of claim 1, further comprising:
    generating a first fingerprint based on: a command, a number of commands, a sequence of commands, a configuration of a command, an argument of a command, a parameter of a command, and any combination thereof.

5. The method of claim 1, further comprising:
    generating a second fingerprint based on: commands, number of commands, sequence of commands, a configuration of commands, and any combination thereof.

6. The method of claim 1, further comprising:
    parsing the first configuration file to detect code objects, code, commands, and any combination thereof.

7. The method of claim 1, further comprising:
    parsing the second configuration file to detect code objects, code, commands, and any combination thereof.

8. The method of claim 1, further comprising:
    detecting a cybersecurity object, wherein the cybersecurity object is associated with a cybersecurity threat.

9. The method of claim 8, wherein the cybersecurity threat includes any one of: an exposure, a vulnerability, malware, ransomware, spyware, a misconfiguration, and any combination thereof.

10. A non-transitory computer-readable medium storing a set of instructions for improving inspection of software containers deployed in a cloud computing environment, the set of instructions comprising:
one or more instructions that, when executed by one or more processing circuitries of a device, cause the device to:
detect a plurality of configuration files, each configuration file corresponding at least to a software container image, the software container image corresponding to a software container deployed in the cloud computing environment;
parse a first configuration file of the plurality of configuration files to detect a first plurality of commands;
generate a first fingerprint based at least on the detected first plurality of commands;
parse a second configuration file of the plurality of configuration files to detect a second plurality of commands;
generate a second fingerprint based at least on the detected second plurality of commands;
determine that the first configuration file matches the second configuration file in response to detecting a match based on the first fingerprint and the second fingerprint;
determine that the first configuration file mismatches the second configuration file in response to detecting a mismatch based on the first fingerprint and the second fingerprint; and
inspect the first configuration file for a cybersecurity object in response to determining that the first configuration file matches the second configuration file.

11. A system for improving inspection of software containers deployed in a cloud computing environment comprising:
one or more processing circuitries configured to:
detect a plurality of configuration files, each configuration file corresponding at least to a software container image, the software container image corresponding to a software container deployed in the cloud computing environment;
parse a first configuration file of the plurality of configuration files to detect a first plurality of commands;
generate a first fingerprint based at least on the detected first plurality of commands;
parse a second configuration file of the plurality of configuration files to detect a second plurality of commands;
generate a second fingerprint based at least on the detected second plurality of commands;
determine that the first configuration file matches the second configuration file in response to detecting a match based on the first fingerprint and the second fingerprint;
determine that the first configuration file mismatches the second configuration file in response to detecting a mismatch based on the first fingerprint and the second fingerprint; and
inspect the first configuration file for a cybersecurity object in response to determining that the first configuration file matches the second configuration file.

12. The system of claim 11, wherein the one or more processing circuitries are further configured to:
generate another second fingerprint when it is determined that the first configuration file mismatches the second configuration file.

13. The system of claim 12, wherein the one or more processing circuitries are further configured to:
generate another second fingerprint based on an another configuration file, which is not the second configuration file.

14. The system of claim 11, wherein the one or more processing circuitries are further configured to:
generate a first fingerprint based on: a command, a number of commands, a sequence of commands, a configuration of a command, an argument of a command, a parameter of a command, and any combination thereof.

15. The system of claim 11, wherein the one or more processing circuitries are further configured to:
generate a second fingerprint based on: commands, number of commands, sequence of commands, a configuration of commands, and any combination thereof.

16. The system of claim 11, wherein the one or more processing circuitries are further configured to:
parse the first configuration file to detect code objects, code, commands, and any combination thereof.

17. The system of claim 11, wherein the one or more processing circuitries are further configured to:
parse the second configuration file to detect code objects, code, commands, and any combination thereof.

18. The system of claim 11, wherein the one or more processing circuitries are further configured to:
detect a cybersecurity object, wherein the cybersecurity object is associated with a cybersecurity threat.

19. The system of claim 18, wherein the cybersecurity threat includes any one of: an exposure, a vulnerability, malware, ransomware, spyware, a misconfiguration, and any combination thereof.

* * * * *